| (12) | United States Patent<br>Hiraide | (10) Patent No.: US 9,535,252 B2<br>(45) Date of Patent: Jan. 3, 2017 |

(54) VIRTUAL IMAGE DISPLAY APPARATUS

(71) Applicant: SEIKO EPSON CORPORATION, Tokyo (JP)

(72) Inventor: Noriaki Hiraide, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 76 days.

(21) Appl. No.: 14/568,926

(22) Filed: Dec. 12, 2014

(65) Prior Publication Data

US 2015/0185481 A1    Jul. 2, 2015

(30) Foreign Application Priority Data

Dec. 26, 2013   (JP) ................... 2013-268722

(51) Int. Cl.
*G02B 27/14*    (2006.01)
*G09G 5/00*    (2006.01)
(Continued)

(52) U.S. Cl.
CPC ......... *G02B 27/0172* (2013.01); *G02B 6/0053* (2013.01); *G02B 6/002* (2013.01);
(Continued)

(58) Field of Classification Search
CPC ... G02B 27/01; G02B 27/017; G02B 27/0172; G02B 27/14; G02B 27/2214; G02B 2027/0178; G02B 2027/015; G02B 2027/0152; G02B 2027/0118; G02B 6/00; G02B 6/002; G02B 6/0053; G02B 6/0055; G02B 17/0856; G02B 27/0101; G02B 27/022; G02B 27/0189; G02B 2027/014; G02B 2027/0116; G02B 2027/011; G02B 2027/017; G02B 6/0045; G02B 17/006; G06T 19/006

(Continued)

(56) References Cited

U.S. PATENT DOCUMENTS 8,564,883 B2 * 10/2013 Totani ................ G02B 27/0172
345/8
8,587,869 B2 * 11/2013 Totani ................ G02B 27/0172
359/629

(Continued)

FOREIGN PATENT DOCUMENTS

JP    A-2013-200553    10/2013

*Primary Examiner* — Loha Ben
(74) *Attorney, Agent, or Firm* — Oliff PLC

(57) ABSTRACT

A virtual image display apparatus includes a video image display element which generates video image light, a light guiding member which includes a plurality of optical surfaces and guides the video image light by reflecting on inner surface side, and an optical device portion such as a projector lens through which the video image light passes when the video image light is made to foe incident on the light guiding member. Here, the light guiding member is a block-shaped member including a pair of facing first and third surfaces which extend substantially in parallel with each other and fully reflect the video image light, and first reference optical axis of the optical device portion on a light emitting side extends in a direction in which the first reference optical axis forms an obtuse angle with respect to a traverse reference axis corresponding to an eye alignment direction.

16 Claims, 11 Drawing Sheets

(51) Int. Cl.
    *G02B 27/01*     (2006.01)
    *F21V 8/00*     (2006.01)
    *G02B 27/22*     (2006.01)
    *G06T 19/00*     (2011.01)

(52) U.S. Cl.
    CPC .. *G02B 27/2214* (2013.01); *G02B 2027/0118* (2013.01); *G02B 2027/0152* (2013.01); *G02B 2027/0178* (2013.01); *G06T 19/006* (2013.01)

(58) Field of Classification Search
    USPC ............ 359/629, 630; 345/7–9; 348/53; 1/1
    See application file for complete search history.

(56) References Cited

U.S. PATENT DOCUMENTS

| | | | | |
|---|---|---|---|---|
| 9,046,687 B2* | 6/2015 | Hiraide | ............ | G02B 27/0176 |
| 9,081,182 B2* | 7/2015 | Miyao | ............ | G02B 27/0172 |
| 9,116,342 B2* | 8/2015 | Totani | ............ | G02B 27/0172 |
| 9,195,066 B2* | 11/2015 | Komatsu | ............ | G02B 27/0172 |
| 9,223,137 B2* | 12/2015 | Takagi | ............ | G02B 6/0053 |
| 9,341,851 B2* | 5/2016 | Hiraide | ............ | G02B 27/0172 |
| 9,400,389 B2* | 7/2016 | Totani | ............ | G02B 27/0172 |
| 2013/0222896 A1 | 8/2013 | Komatsu et al. | | |
| 2014/0267636 A1* | 9/2014 | Takagi | ............ | G02B 27/0172 348/53 |
| 2014/0327603 A1* | 11/2014 | Hiraide | ............ | G02B 27/0172 345/8 |
| 2014/0340285 A1* | 11/2014 | Hiraide | ............ | G02B 27/0179 345/8 |
| 2015/0153575 A1* | 6/2015 | Komatsu | ............ | G02B 27/0172 345/8 |
| 2015/0160460 A1* | 6/2015 | Komatsu | ............ | G02B 27/0172 359/629 |
| 2015/0338653 A1* | 11/2015 | Subramaniam | .... | G02B 27/0172 345/8 |
| 2016/0077341 A1* | 3/2016 | Takagi | ............ | G02B 6/0053 349/11 |

* cited by examiner

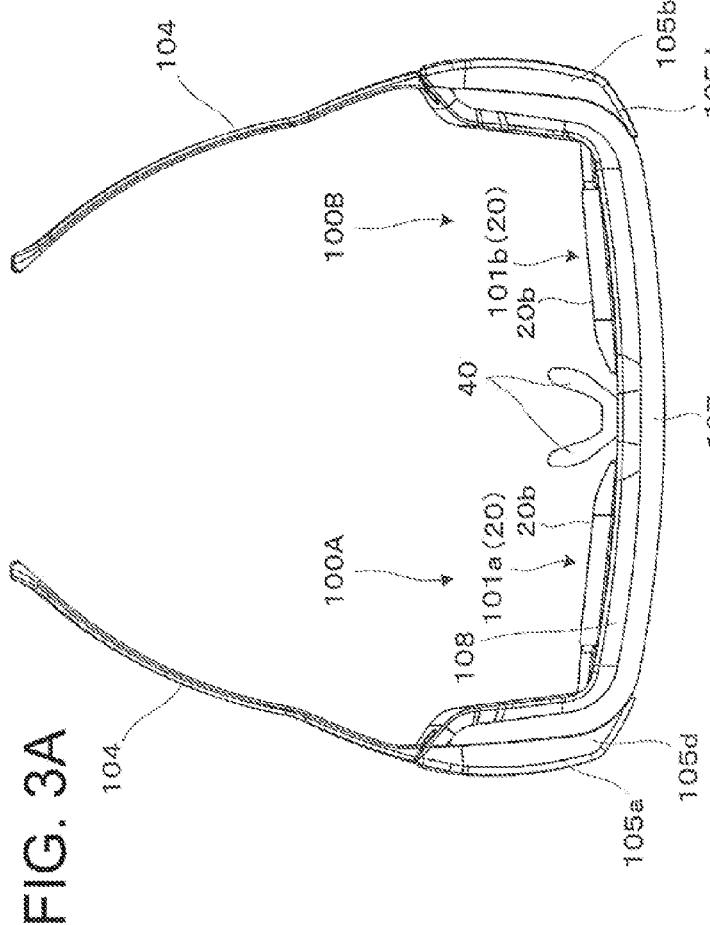
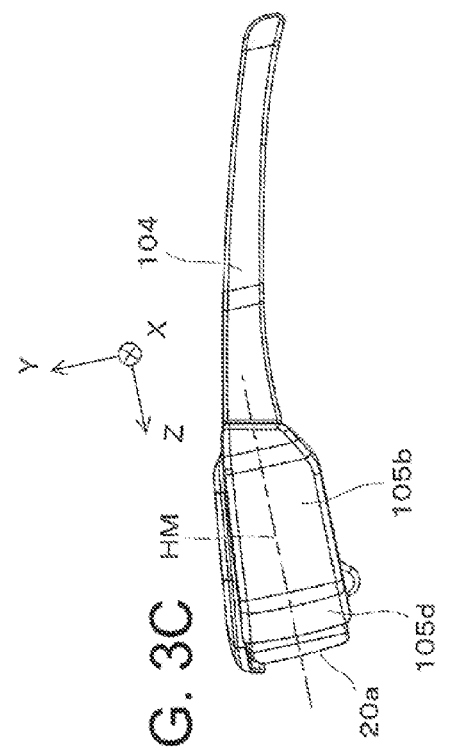
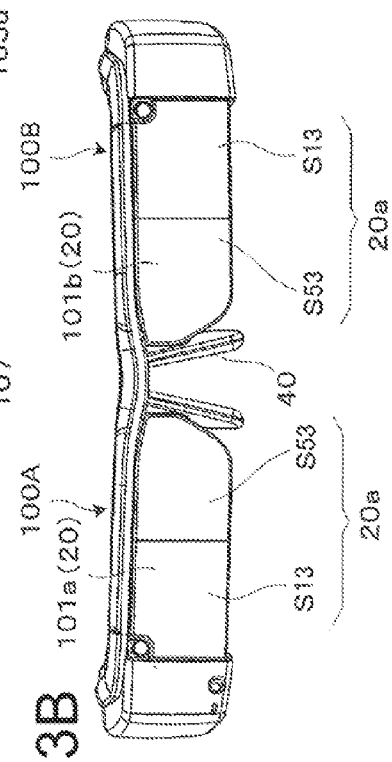

FIG. 7A
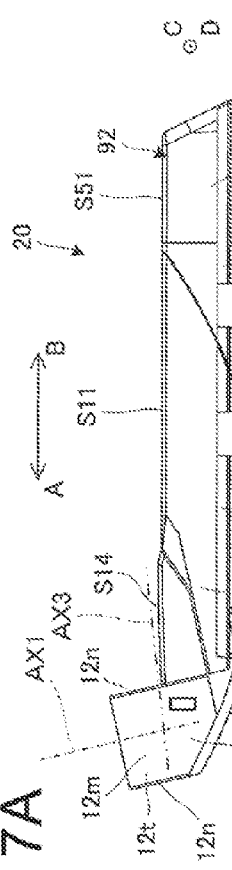
FIG. 7D
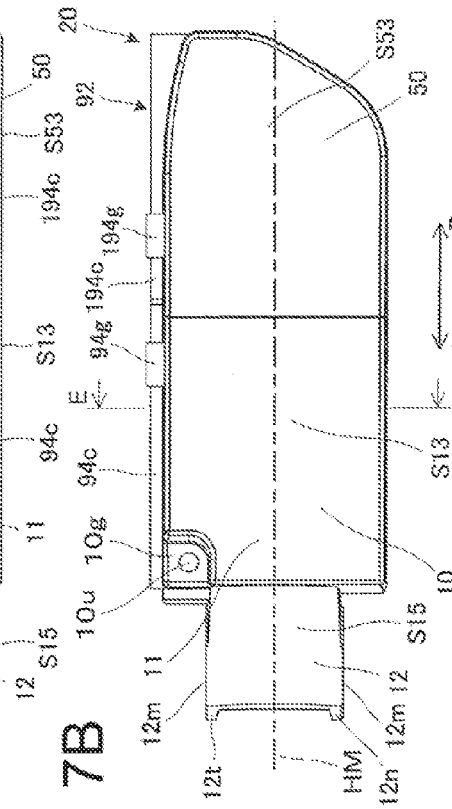
FIG. 7B
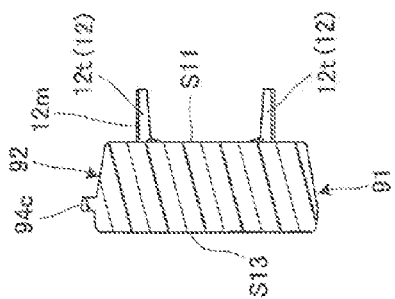
FIG. 7E
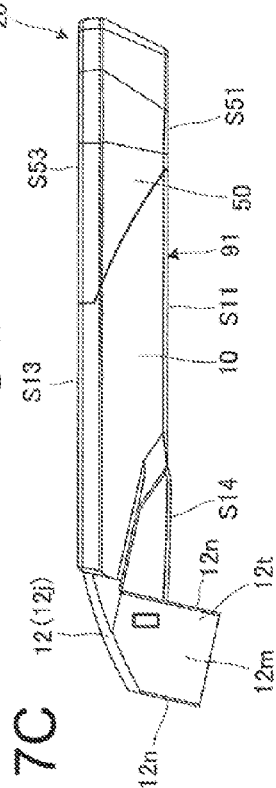
FIG. 7C
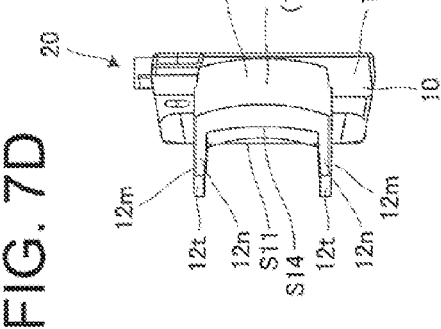

VIRTUAL IMAGE DISPLAY APPARATUS

BACKGROUND

1. Technical Field

The present invention relates to a virtual image display apparatus which presents a video image formed by an image display element and the like to a viewer, and particularly to a virtual image display apparatus which is preferably applied to a head mount display designed to be mounted on the head of the viewer.

2. Related Art

Various optical systems to he embedded in a virtual image display apparatus such as a head mount display (hereinafter, also referred to as an HMD) designed to be mounted on the head of a viewer have been proposed. For example, an optical system which displays a virtual image and enables viewing of an external image by using a video image optical system including an image display element and the like and a relatively thick prism member arranged in front of the eyes is known (see JP-A-2013-200553, for example).

In the case of the virtual image display apparatus using the prism member as described above, it is not easy to achieve a decrease in thickness and weight while implementing an optical system including the video image optical system and the prism member, which can be fitted to a face surface, due to restriction of optical design. If priority is placed on the decrease in thickness, a degree of freedom in design is limited.

In contrast, it is also possible to consider that the shape of the prism member is set to a simple plate shape. However, it is not easy to achieve the decrease in thickness and weight while implementing the entire system which can be fitted to the face surface.

SUMMARY

An advantage of some aspects of the invention is to provide a virtual image display apparatus capable of achieving a decrease in thickness and weight while implementing an optical system portion which can be fitted to the face surface.

An aspect of the invention is directed to a virtual image display apparatus including: a video image element which generates video image light; a light guiding member which includes a plurality of optical surfaces and guides the video image light from the video image element by reflecting the video image light on an inner surface side; and an optical device portion through which the video image light passes when the video image light from the video image element is made to be incident on the light guiding member, in which the light guiding member is a block-shaped member which includes, as the plurality of optical surfaces, a pair of facing planar optical surfaces which extend substantially in parallel with each other and fully reflect the video image light, and in which an optical axis of the optical device portion on a light emitting side extends in a direction in which the optical axis forms an obtuse angle from a light incident portion of the light guiding member with respect to a traverse reference axis in parallel with an eye alignment direction. Here, the planar optical surface includes a plane and an optical surface which is substantially flat as a whole even if the optical surface is slightly curved.

According to the virtual image display apparatus, the light guiding member is the block-shaped member including the pair of facing planar optical surfaces which extend substantially in parallel with each other and fully reflect the video linage light, and therefore, it is possible to easily simplify an appearance shape of the light guiding member and the like and to obtain a diopter scale and a magnification which are close to those of naked eyes in a case of seeing through the light guiding member. In addition, since the optical axis of the optical device portion on the light emitting side extends from the light incident portion of the light guiding member in the direction in which the optical axis forms the obtuse angle with respect to the traverse reference axis corresponding to the eye alignment, it is possible to enhance a fitting property when the optical device portion and the light guiding member are arranged so as to extend from the face surface to the temporal areas along the face surface and the temporal areas and to facilitate a decrease in thickness and weight as a result.

In another aspect of the invention, the obtuse angle formed by the optical axis of the optical device portion on the light emitting side with respect to the traverse reference axis of the light guiding member is from 95° to 135°. If the obtuse angle formed by the optical axis of the optical device portion on the light emitting side with respect to the traverse reference axis of the light guiding member is equal to or greater than 95°, it is possible to prevent a connecting portion between the optical device portion and the light guiding member from forming a squareangular shape and projecting from the face surface. If the obtuse angle between the axes is equal to or less than 135, it is possible to suppress sticking of a tip end and the like of the optical device portion from the side of the face surface or in the traverse direction.

In still another aspect of the invention, the optical axis of the optical device portion on the light emitting side extends along a reference plane which is in parallel with the traverse reference axis and a visual line reference axis extending substantially in a front direction of a face of a viewer. In this case, the light guiding member extends in the traverse direction from the tip end of the optical device portion, and the light guiding member and the optical device portion can be arranged so as to be aligned in the traverse direction along a periphery of the head. In addition, the visual line reference axis can be slightly inclined downward, for example, with respect to the horizontal direction.

In yet another aspect of the invention, the light guiding member extends so as to be inclined with respect to the traverse reference axis. In such a case, the light guiding member is arranged along a periphery of the eyes, and it is possible to achieve a shape which further follows the shape of the face surface.

In still yet another aspect of the invention, the optical device portion includes a lens and a lens barrel which holds the lens. In such a case, it is possible to form an image by using the lens, and an effect of extending the optical device portion in the obtuse angle direction with respect to the traverse reference axis is enhanced since the optical device portion is elongated by a length corresponding to the lens.

In further another aspect of the invention, the optical device portion includes an abutting portion which enables relative positioning by abutting a positioning reference surface additionally provided in the light incident portion of the light guiding member. In such a case, it is possible to directly perform positioning of the optical device portion and the light guiding member and to easily enhance positioning accuracy.

In still further another aspect of the invention, the abutting portion is a fitting frame body provided at an end portion of the lens barrel portion which holds the lens therein. In this case, it is possible to perform positioning with high accuracy with a simple configuration using the lens barrel for the lens.

In yet further another aspect of the invention, the light guiding member includes a projecting portion provided with the positioning reference surface, and the fitting frame body receives the projecting portion. In such a case, it is possible to perform the positioning by fitting the fitting between the fitting frame body and the projecting portion.

In still yet further another aspect of the invention, the light guiding member is a relay optical system which forms an intermediate image therein.

In a further aspect of the invention, the optical device portion includes a holding portion which holds the video image element, and the holding portion includes an abutting portion which enables relative positioning by abutting a positioning reference surface additionally provided in the light incident portion of the light guiding member.

In a still further aspect of the invention, the virtual image display apparatus further includes: a frame portion which supports the light guiding member and the optical device portion, in which the frame portion may include a fixation portion for fixing the light guiding member and the optical device portion which are relatively positioned. In such a case, it is possible to fixedly support the light guiding member and the optical device portion, which are relatively positioned, at the frame portion.

In a yet further aspect of the invention, the light guiding member includes a rib which is formed at a predetermined location along an outer periphery, and the rib is fitted into a groove provided in the frame portion. In this case, it is possible to stably support the tip end side of the light guiding member at the frame portion by the rib and the groove.

In a still yet further aspect of the invention, the frame portion includes a frame portion which is arranged on a far aide from the viewer and is made of metal and a resin portion which is arranged on a close side to the viewer, and the frame portion and the resin portion extend from locations at which the frame portion and the resin portion face temporal areas of the viewer in a direction in which the frame portion and the resin portion form an obtuse angle with respect to the traverse reference axis in the same manner as the optical axis of the optical device portion on the light emitting side.

In a furthermore aspect of the invention, the light guiding member includes four or more surfaces as the plurality of optical surfaces, and the video image light from the video image element is fully reflected by a third surface which faces a first surface, then is fully reflected by the first surface, is reflected by a second surface, and thus is incident on the first surface before transmitting through the first surface from among the plurality of optical surfaces and reaching a viewer side. In such a case, it is possible to arrange the light incident portion of the light guiding member at a position which is relatively far from the second surface and to easily and appropriately separate the optical device portion from the light guiding member.

In a still furthermore aspect of the invention, the virtual image display apparatus further includes: a light transmitting member which is attached to the second surface of the light guiding member to cause the viewer to visually recognize external light and the video image light in an overlapped manner. In such a case, it is possible to configure a see-through-type optical system which overlaps the video image light and the external light.

In a yet furthermore aspect of the invention, the virtual display apparatus further includes: two display devices, each of which includes the video image element and the light guiding member. In such a case, it is possible to display a virtual image for both eyes by the two display apparatus and to fit the virtual image display apparatus as a whole to the face surface.

BRIEF DESCRIPTION OF THE DRAWINGS

The invention will be described with reference to the accompanying drawings, wherein like numbers reference like elements.

FIG. 3A is a planar view showing the appearance of the virtual image display apparatus, FIG. 3B is a front view thereof, and FIG. 3C is a side view thereof.

FIGS. 7A to 7E are a planar view, a front view, a bottom view, a left end view, a cross-sectional view from the arrow EE of a prism member including a light guiding member.

DESCRIPTION OF EXEMPLARY EMBODIMENTS

Hereinafter, a detailed description will be given of an embodiment of a virtual image display apparatus according to the invention with reference to FIG. 1 and the like.

Figure 1:
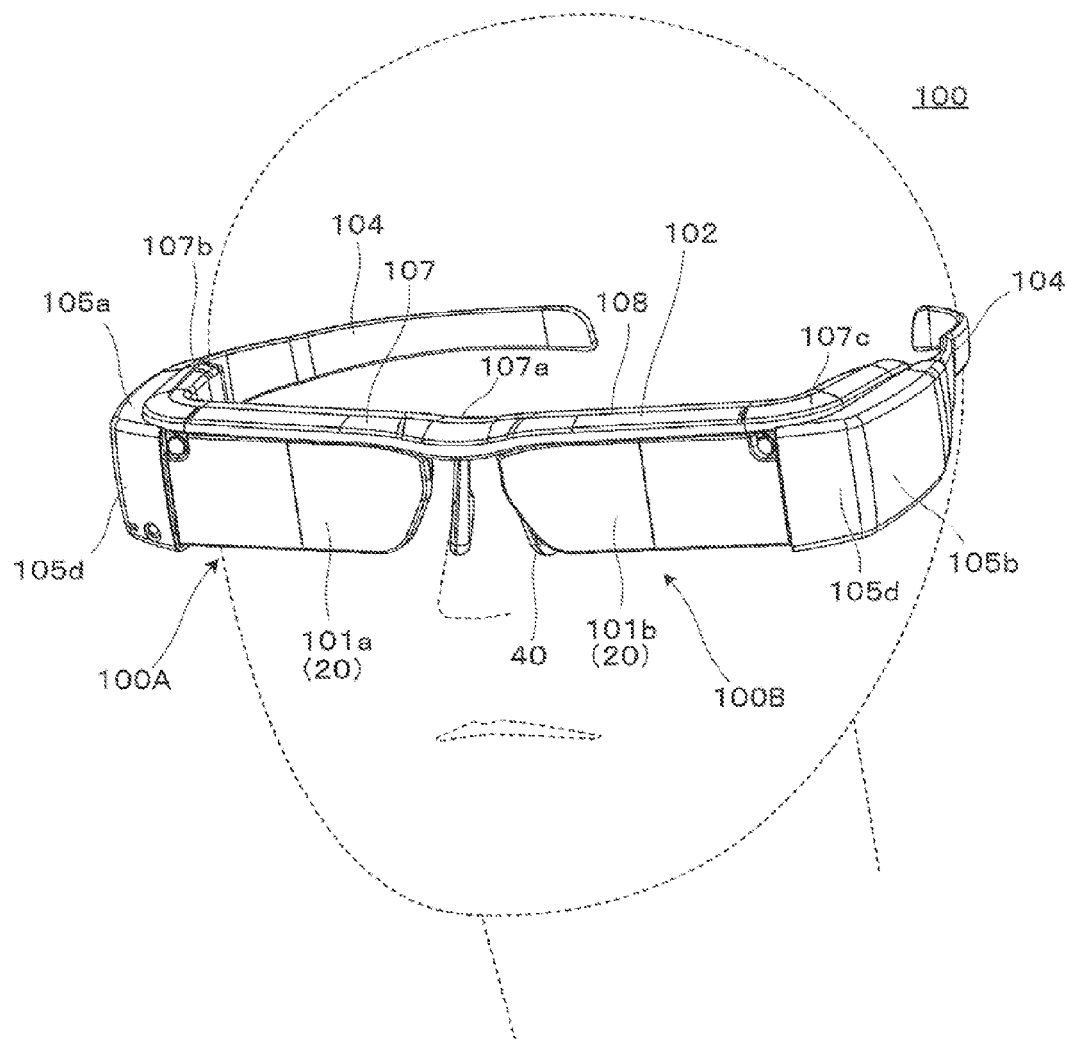
FIG. 1 is a perspective view illustrating an appearance of a virtual image display apparatus according to an embodiment of the invention.

As shown in FIG. 1, a virtual image display apparatus 100, which includes a light guiding device, according to the embodiment is a head mount display with an appearance similar to glasses, can cause a viewer or a user who wears the virtual linage display apparatus 100 to visually recognize image light (video image light) by a virtual image, and can cause the viewer to visually recognize or view an external image in a see-through manner. The virtual image display apparatus 100 is provided with first and second optical members 101a and 101b which cover the front of eyes of the viewer while providing visualization, a frame portion 102 which supports both the optical members 101a and 101b, and first and second image formation main body portions 105a and 105b which are added to portions from both ends of the frame portion 102 in the left-right direction to temples 104 on the rear side. Here, a first display device 100A as a combination of the first optical member 101a and the first image formation main body portion 105a on the left side in the drawing is a portion where a virtual image for the right eye is formed, and the first display device 100A also functions alone as a virtual image display apparatus. In addition, a second display device 100B as a combination of the second optical member 101b and the second image formation main body portion 105b on the right side in the drawing is a portion where a virtual image for the left eye is formed, and the second display device 100B also functions alone as a virtual image display apparatus.

Figure 2:
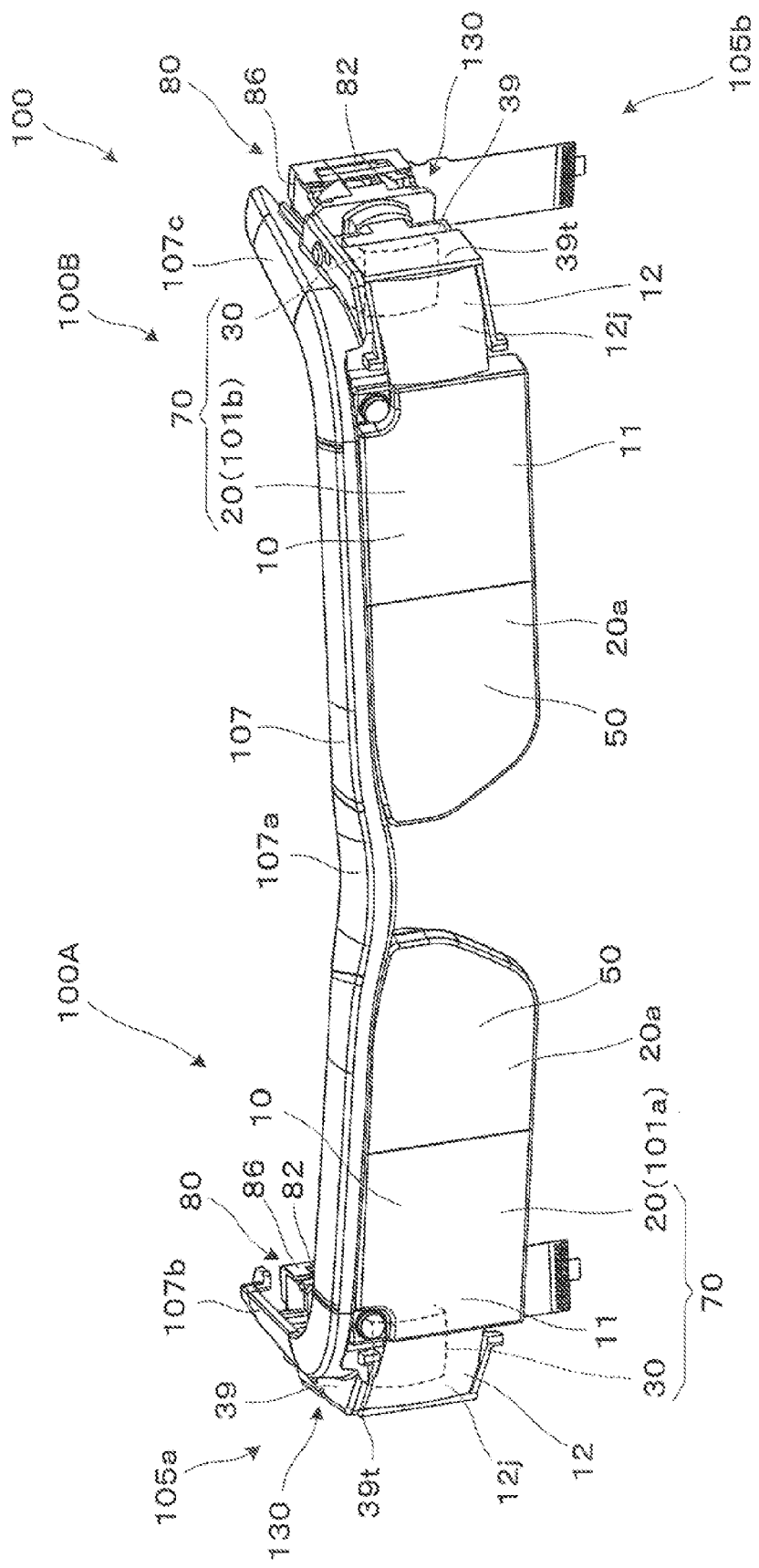
FIG. 2 is a perspective view showing an internal structure of the virtual image display apparatus from which external accessory members are removed.
Figure 4:
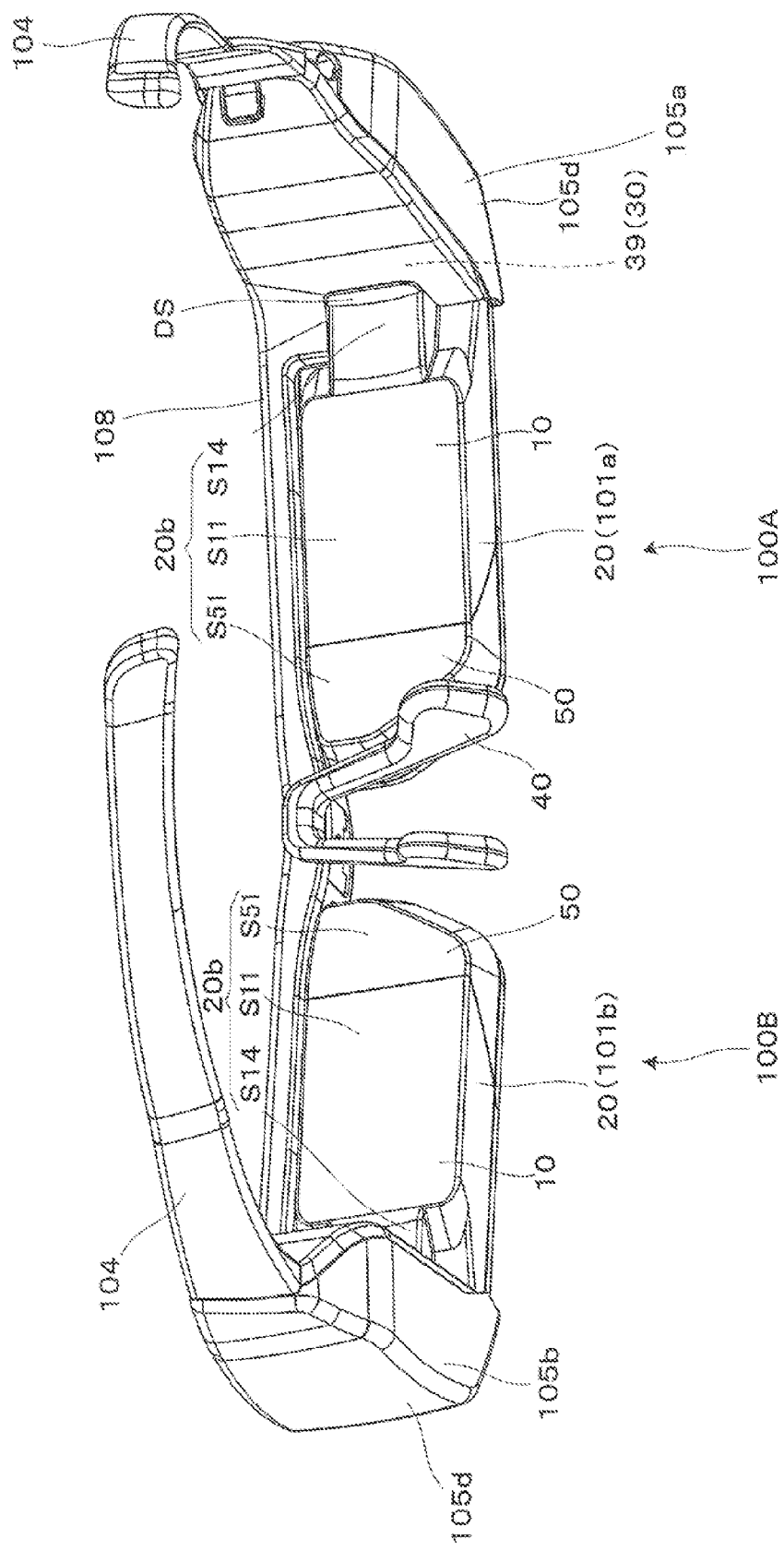
FIG. 4 is a perspective view of the appearance of the virtual image display apparatus shown from another angle.

FIG. 2 shows an internal structure of the virtual image display apparatus 100, and the appearance and the inside of the virtual image display apparatus 100 can be compared by comparison of FIG. 2 with FIG. 1. For example, each of the first and second image formation main body portions 105a and 105b is configured of an image display device 80 which includes a projector lens 30 accommodated in a lens barrel portion 39 and a video image display element (video image element) 82.

As shown in the respective drawings from FIG. 1 to FIG. 4 of the appearance and the inside thereof, the frame portion 102 provided in the virtual image display apparatus 100 is provided with a frame 107 arranged on an upper end side and a resin portion 108 which is arranged along the frame 107 on the rear side thereof. In addition, the virtual image display apparatus 100 has a configuration in which a frame-shaped portion is not provided on the lower side. The frame 107 which configures the frame portion 102 is a thin and long plate-shaped member which is curved in a U shape and is provided with a front portion 107a which extends in the left-right traverse direction as a direction corresponding to alignment of the eyes of the viewer and a pair of side portions 107b and 107c which extend in a depth direction as a direction corresponding to the front and the back of the viewer. Both the side portions 107b and 107c are not in exactly parallel with other and form a small angle such that the side portions 107b and 107c slightly expand toward the tip ends thereof. The frame 107, namely the front portion 107a and the side portions 107b and 107c are a metal integrated component which is formed of a metal material such as die cast aluminum. The resin portion 108 is arranged along the frame 107 and cooperates with the frame 107 by being fitted to the frame 107 so as to be able to accommodate various cables and the like for image formation, for example. In the frame 107, the width of the front portion 107a and the resin portion 108 in the depth direction is substantially the same as the thickness or the width of the light guiding device 20 corresponding to the first and second optical members 101a and 101b. On the left side of the frame 107, specifically, at a portion from the left end portion of the front portion 107a when viewed from a front direction of the virtual image display device to the side portion 107b, the first optical member 101a and the first image formation main body portion 105a are aligned and supported by being directly fixed by screwing, for example. On the right side of the frame 107, specifically, at a portion from the right end portion of the front portion 107a when viewed from a front direction of the virtual image display device to the side portion 107c, the second optical member 101b and the second image formation main body portion 105b are aligned and supported by being directly fixed by screwing, for example. In addition, the first optical member 101a and the first image format ion main body portion 105a are aligned so as to be fitted to each other, and the second optical member 101b and the second image formation main body portion 105b are aligned so as to be fitted to each other.

The frame 107 and the resin portion 108 which configure the frame portion 102 support the first and second image formation main body portions 105a and 105b and also play a role in protecting the insides of the first and second image formation main body portions 105a and 105b by cooperation with a cover-shaped external accessory member 105d which covers the first and second image formation main body portions 105a and 105b. In addition, the frame 107 is separated from or in loose contact with an upper portion except for a roof side of the first and second optical members 101a and 101b or the light guiding devices 20, which are coupled to the first and second image formation main body portions 105a and 105b. For this reason, even if there is a difference in thermal coefficients between the light guiding devices 20 at the center and the frame portion 102 including the frame 107, expansion of the light guiding devices 20 in the frame portion 102 is allowed, and it is possible to prevent strain, deformation, and breakage from occurring in the light guiding device 20.

A nose receiving portion 40 is additionally provided in the frame portion 102. The nose receiving portion 40 plays a role in supporting the frame portion 102 by abutting the nose of the viewer. That is, the frame portion 102 is arranged in front of the face of the viewer by the nose receiving portion 40 supported at the nose and the pair of temples 104 supported at the ears. The nose receiving portion 40 is fixed by screwing at the front portion 107a of the frame 107 which is one of the members configuring the frame portion 102. In addition, the appearance shown with reference to FIG. 1 is an example, and designs for portions which are not directly involved in the optical mechanism, such as a mechanism for fixing screws, can be appropriately changed.

As shown in FIG. 2 and the like, it is possible to understand that the first display device 100A is provided with a perspective projection device 70 as an optical system for projection and an image display device 80 which forms video image light. The perspective projection device 70 plays a role in projecting an image formed by the image display device 80 as a virtual image to the eyes of the viewer. The perspective projection device 70 is provided with a first optical member 101a or the light guiding device 20 and the projector lens 30 for image formation. The first optical member 101a or the light guiding device 20 are configured of a light guiding member 10 for light guiding and visualization and a light transmitting member 50 for visualization. In addition, the first image formation main body portion 105a is configured of the image display device 80 and the projector lens 30. The projector lens 30 which is configured of a group of lenses is accommodated in the lens barrel portion 39 and configures an optical device portion 130 along with the lens barrel portion 30 as will be described in detail later. The optical device portion 130, namely the projector lens 30 is fixed at an end portion 39t of the lens barrel portion 39 in a state of being precisely positioned by fitting with respect to the light guiding device 20.

The image display device 80 includes a video image display element (video image element) 82 as a transmissive space light modulation device, an illumination device (not shown) as a backlight which emits illumination light to the video image display element 82, and a drive control unit (not shown) which controls operations of the video image display element 82 and the like as will be described in detail later. The video image display element 82 is accommodated in a video image element case 86 and assembled with the lens barrel portion 39, which accommodates the projector lens 30 for image formation, via the video image element case 86. In other words, the lens barrel portion 39 is a coupling member which couples the video image display element 82, the projector lens 30, the light guiding device 20, and the like.

The light guiding device 20 is a block-shaped member configured of the light guiding member 10 for light guiding and visualization and the light transmitting member 50 for visualization as described above. The light guiding member 10 is a part of the prism-type light guiding device 20 and an integrated member, and can be separately understood as a first light guiding portion 11 on the light emitting side and a second light guiding portion 12 on the light incident side. The light transmitting member 50 is a member (assistant optical block) which assists the visualization function of the light guiding member 10 and forms a light guiding device 20 by being integrally fixed to the light guiding member 10. By fitting a tip end portion 12j of the light guiding device 20 with the aforementioned configuration, which is positioned on the light source side or the light incident side (root side) to the end portion 39t of the lens barrel portion 39, the light guiding device 20 is precisely positioned with respect to the projector lens 30 and is fixed thereto.

Here, a first exposed surface 20a as a front (outside) exposed surface and a second exposed surface 20b as a rear (inside) exposed surface among the optical surfaces which configure the light guiding device 20 are portions which are exposed to the outside and have an influence on the see-through function as shown in FIGS. 3A to 3C and 4, for example. In addition, the first exposed surface 20a is configured of a third surface S13 from among the optical surfaces of the light guiding member 10 and a third transmitting surface S53 as an optical surface of the light transmitting member 50, and the second exposed surface 20b is configured of a first surface S11 and a fourth surface S14 from among the optical surfaces of the light guiding member 10 and a first transmitting surface S51 from among the optical surfaces of the light transmitting member 50 as shown in the drawings.

Figure 5:
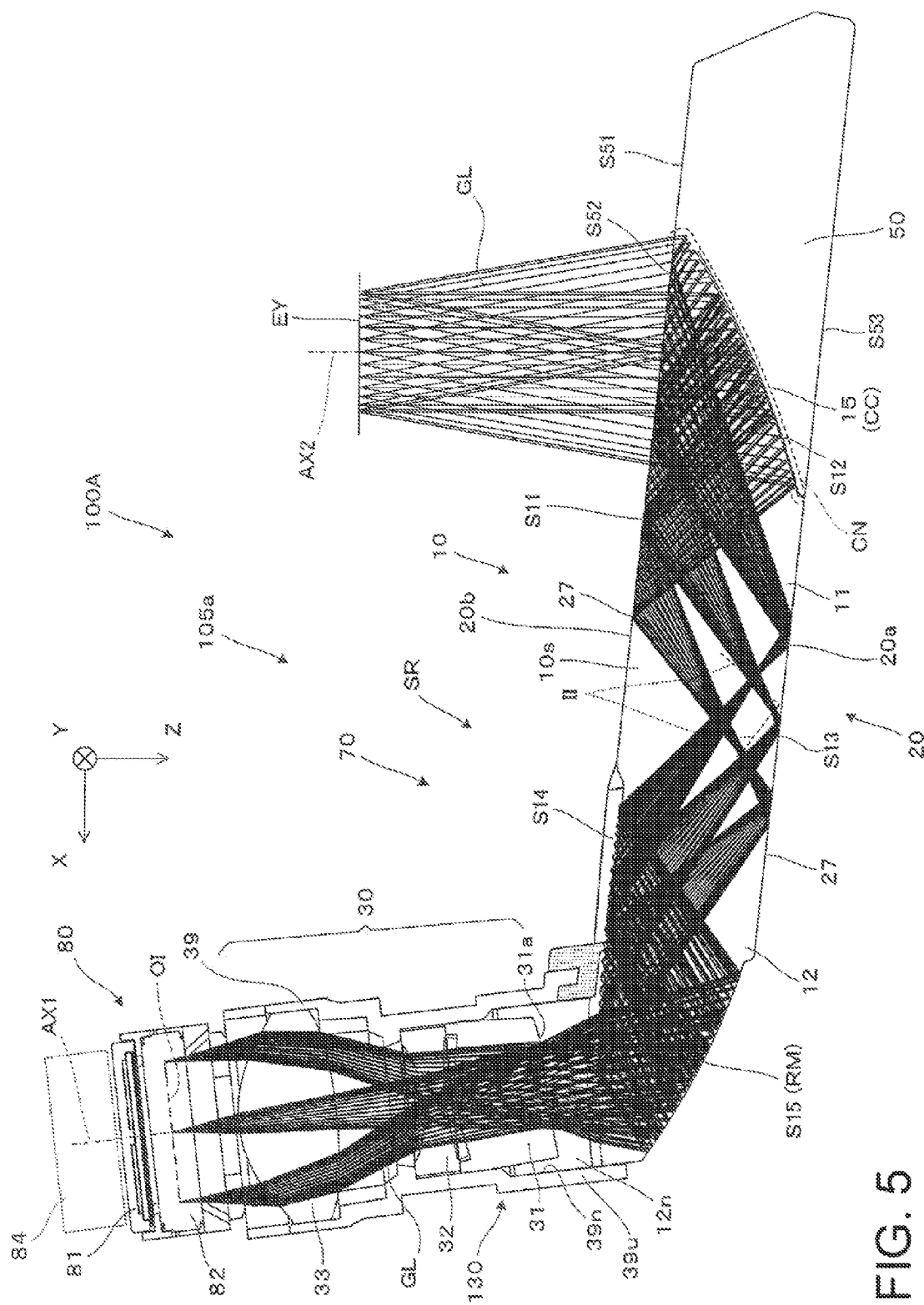
FIG. 5 is a cross-sectional view of a main body portion, which configures the virtual image display apparatus, in a plan view.

Hereinafter, a detailed description will be given of the image display device 80 and the projector lens 30 which configure the first image formation main body portion 105a (see FIG. 1) with reference to FIG. 5.

The image display device 80 includes an illumination device 81 which emits illumination light to the video image display element 82 and a drive control unit 84 which controls operations of the illumination device 81 and the video image display element 82 in addition to the aforementioned video image display element 82.

The illumination device 81 of the image display device 80 includes a light source which generates light including three colors, namely red, green, and blue and a backlight guiding portion which disperses the light from the light source and forms a light flux with a rectangular cross section. The video image display element (video image element) 82 is formed of a liquid crystal display device, for example, is configured of a plurality of pixels, and forms image light as a display target, such as a moving image, by spatially modulating the illumination light from the illumination device 81. The drive control unit 84 is configured of a light source drive circuit which supplies power to the illumination device 81 and causes the illumination device 81 to emit illumination light with stable luminance and a liquid crystal drive circuit which forms color video image light or image light as a transmittance pattern which functions as a source of a moving image or a stationary image by outputting an image signal or a drive signal to the video image display element (video image element) 82 although not shown in the drawing. In addition, it is possible to provide an image processing function to the liquid crystal drive circuit, or alternatively, it is also possible to provide the image processing function to an external control circuit.

The projector lens 30 is a projection optical system which includes, as constituent elements, lenses 31 to 33 as three optical elements along an optical axis on the incident light side, and is supported by the lens barrel portion 39 accommodating these lenses (optical elements) 31 to 33. The lenses 31 to 33 are aspherical lenses including both a non-axisymmetric aspherical surface and an axisymmetric aspherical surface, and cooperate with a part of the light guiding member 10 as a relay optical system to form an intermediate image, which corresponds to a display image of the video image display element 82, inside the light guiding member 10. In the respective lenses (optical elements) 31 to 33, a lens surface 31a as a light emitting surface of the first lens 31 is a non-axisymmetric aspherical surface, and lens surfaces other than the lens surface 31a are axisymmetric aspherical surfaces.

Hereinafter, a detailed description will be given of the light guiding device 20 and the like. As described above, the light guiding device 20 is configured of the light guiding member 10 and the light transmitting member 50. Among the light guiding member 10 and the light transmitting member 50, the light guiding member 10 has a portion, which linearly extends, on the center side (in front of the eyes) close to the nose in a plan view. The first light guiding portion 11, which is arranged on the center side close to the nose, namely on the light emitting side, in the light guiding member 10 includes, as side surfaces with optical functions, a first surface S11, a second surface S12, and a third surface S13. The second light guiding portion 12 which is arranged on a peripheral side separated from the nose, namely on the light incident side includes, as side surfaces with optical functions, a fourth surface S14 and a fifth surface S15. Among the surfaces, the first surface S11 and the fourth surface S14 are continuously adjacent to each other, and the third surface S13 and the fifth surface S15 are continuously adjacent to each other. In addition, the second surface S12 is arranged between the first surface S11 and the third surface S13, and the fourth surface S14 and the fifth, surface S15 are adjacent to each other at a large angle. Furthermore, the first surface S11 and the third surface S13 which are arranged so as to face each other are planes substantially in parallel with each other. In contrast, the other surfaces with the optical functions, namely the second surface S12, the fourth surface S14, and the fifth surface S15 are non-axisymmetric spherical surfaces (free spherical surfaces).

Here, the surfaces other than the first surface S11 to the third surface S13 in the plurality of surfaces which configure the light guiding member 10, namely the surfaces S14 and S15 include at least one point with different curvature symbols depending on directions with respect to at least one free spherical surface. With such a configuration, the guiding of the video image light can be precisely controlled, and a decrease in size of the light guiding member 10 can be made.

In addition, the light guiding member 10 is joined to the light transmitting member 50 via an adhesive layer CC, and a portion configured of the joining surface between the light guiding member 10 and the light transmitting member 50 and the adhesive layer CC will be referred to as a joining portion CN in the light guiding device 20. In addition, the light guiding device 20 is formed by joining a base material of the light guiding member 10 and the light transmitting member 50 at the joining portion CN and then coating the joined base material by dip processing. That is, a hard coating layer 27 of the light guiding member 10 is provided on the light transmitting member 50 and the entire light guiding device 20.

A main body 10s of the light guiding member 10 is formed of a resin material which has a high light transmitting property in a visible region and is molded by injecting and solidifying thermoplastic resin in a mold, for example. As a material of the main body 10s, it is possible to use cycloolefin polymer, for example. Although the main body 10s is formed as an integrally formed article, the light guiding member 10 can be considered therefore by being functionally divided into the first light guiding portion 11 and the second light guiding portion 12 as described above. The first light guiding portion 11 enables wave guiding and emission of video image light GL and enables visualization of external light HL. The second light guiding portion 12 enables incidence and wave guiding of the video image light GL.

In the first light guiding portion 11, the first surface S11 is an optical surface which functions as a refraction surface which emits the video image light GL to the outside of the first light guiding portion 11 and also functions as a full reflective surface which fully reflects the video image light GL on the inner surface side. The first surface S11 is arranged in front of the eyes EY and has a planar shape as described above. In addition, the first surface S11 is a surface formed of the hard coating layer 27 provided on the surface of the main body 10s.

The second surface S12 is a surface of the main body 10s, is an optical surface which includes a half mirror layer 15 additionally provided thereon, and is a non-axisymmetric aspherical surface. The half mirror layer 15 is a reflective film with a light transmitting property (that is, a semi-transmitting reflective film). The half mirror layer (semi-transmitting reflective film) 15 is formed on a partial region (omitted in the drawing), which is obtained by narrowing the second surface S12 in the vertical direction along the Y axis, instead of the entirety of the second surface S12. The half mirror layer 15 is formed by forming a metal reflective film or a dielectric body multilayered film on the partial region PA on a base coating surface of the main body 10s. A reflection rate of the half mirror layer 15 with respect to the video image light GL is equal to or greater than 10% and equal to or less than 50% in a range of the assumed incident range of the video image light GL in terms of facilitating viewing of the external light HL by the see-through function. A reflection rate of the half mirror layer 15 according to a specific embodiment with respect to the video image light GL is set to 20%, for example, and transmittance thereof with respect to the video image light GL is set to 80%, for example.

The third surface S13 is an optical surface which functions as a full reflective surface which fully reflects the video image light GL on the inner surface side. The third surface S13 is arranged substantially in front of the eyes EY, has a planar shape in the same manner as the first surface S11, has a diopter scale of 0 when the external light HL is viewed by causing the external light HL to pass through the first surface S11 and the third surface S13, by the configuration in which the first surface S11 and the third surface S13 are mutually parallel surfaces, and does not particularly cause any variable power. In addition, the third surface S13 is a surface formed by the hard coating layer 27 which is provided on the surface of the main body 10s.

In the second light guiding portion 12, the fourth surface S14 is an optical surface which functions as a full reflective surface which fully reflects the video image light GL on the inner surface side, and is a non-axisymmetric aspherical surface. The fourth surface S14 also functions as a refraction surface which causes the video image light GL to be incident on the inside of the second light guiding portion 12. That is, the fourth surface S14 functions both as a light incident surface which causes the video image light GL to foe incident on the light guiding member 10 from the outside and as a reflective surface which delivers the video image light GL to the inside of the light guiding member 10. In addition, the fourth surface (light incident surface) S14 is a surface which is formed by the hard coating layer 27 provided on the surface of the main body 10s.

In the second light guiding portion 12, the fifth surface S15 is an optical surface formed by farming a light reflective film RM formed of an inorganic material on the surface of the main body 10s. The fifth surface S15 is a non-axisymmetric aspherical surface which functions as a reflective surface.

The light transmitting member 50 forms one light guiding device 20 which is integrally fixed to the light guiding member 10 as described above and is a member (assistant optical block) which assists the visualization function of the light guiding member 10. The light transmitting member 50 includes the first transmitting surface S51, the second transmitting surface S52, and the third transmitting surface S53 as side surfaces with optical functions. Here, the second transmitting surface S52 is arranged between the first transmitting surface S51 and the third transmitting surface S53. The first transmitting surface S51 is on a plane obtained by extending the first surface S11 of the light guiding member 10, the second transmitting surface S52 is a spherical surface which is joined to and integrated with the second surface S12 with the adhesive layer CC, and the third transmitting surface S53 is on a plane obtained by extending the third surface S13 of the light guiding member 10. Among the surfaces, the second transmitting surface S52 and the second surface S12 of the light guiding member 10 are integrated by being joined via the thin adhesive layer CC and thus have shapes with substantially the same curvature.

The light transmitting member (assistant optical block) 50 has a high light transmitting property in the visible region, and a main body portion of the light transmitting member 50 is formed of a thermoplastic resin material with substantially the same refractive index as that of the main body 10s of the light guiding member 10. In addition, the light transmitting member 50 is formed by providing the hard coating layer 27 on the surface of the main body portion in the same manner as the light guiding ember 10. That is, the first transmitting surface S51 and the third transmitting surface S53 are surfaces which are formed by the hard coating layer 27 provided en the surface of the main body portion.

According to the embodiment, the video image light from the video image display element 82 is guided in the light guiding member 10 by reflection performed five times from the first surface S11 to the fifth surface S15 including the second surface S12 as a non-axisymmetric a spherical surface. In addition, the light guiding device 20 which covers the front of the eyes as a whole includes, as the first exposed surface 20a, the third surface S13 and the third transmitting surface S53, includes, as the second exposed, surface 20b, the first surface S11 and the first transmitting surface S51, which are parallel to the third surface S13 and the third transmitting surface S53, and includes the built-in half mirror layer 15 along the second surface S12. As a result, it is possible to achieve both the display of the video image light GL and the see-through function for causing the viewer to visually recognize the external light HL and to correct aberration of the video image light GL in the light guiding member 10.

Hereinafter, a specific description will be given of an optical path of the video image light GL and the like in the virtual image display apparatus 100 with reference to FIG. 5. The video image light GL emitted from the video image display element (video image element) 82 is converged by being made to pass through the respective lenses 31 to 33 which configure the projector lens 30, a prescribed astigmatism is applied thereto, and the video image light GL is then incident on the fourth surface S14 with a positive refractive power, which is provided in the light guiding member 10. In addition, the astigmatism is offset while the video image light GL passes through the respective surfaces of the light guiding member 10, and the video image light is finally emitted in the initial state toward the eyes of the viewer.

Figure 6:
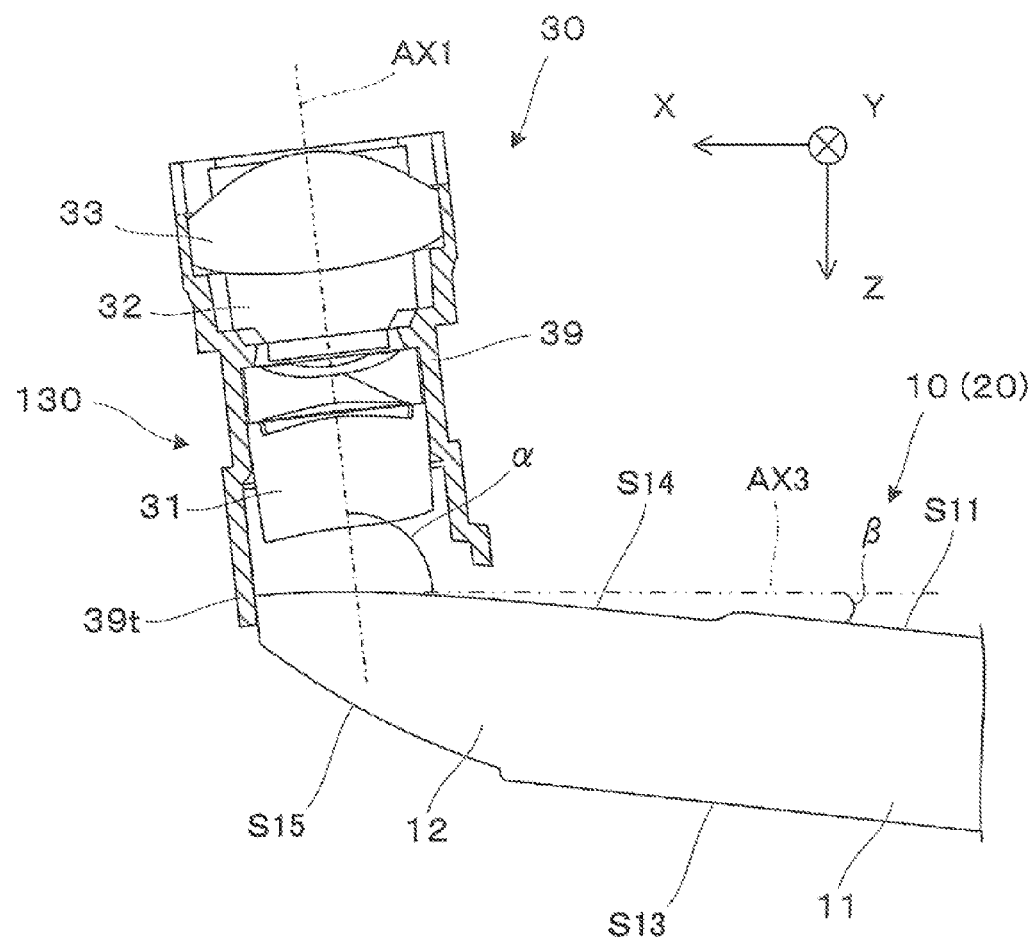
FIG. 6 is a cross-sectional view illustrating an arrangement relationship between an optical device portion and a light guiding member.

Here, a description will be given of the optical device portion 130 including the projector lens 30 with respect to the light guiding member 10. A first reference optical axis AX1 on the side of the optical device portion 130 or the projector lens 30 is inclined at an angle from 5° to 45° with respect to a second reference optical axis AX2 on the light emitting side of the light guiding member 10. Here, the second reference optical axis AX2 corresponds to a visual line reference axis which extends in a Z direction corresponding to a front direction of the face of the viewer. From another viewpoint, the first reference optical axis AX1 on the side of the projector lens 30 forms an obtuse angle α with respect to a traverse reference axis AX3 which is in parallel with an X direction corresponding to an alignment direction of the eyes EY as shown in FIG. 6. In such a case, the traverse reference axis AX3 orthogonally intersects the second reference optical axis (visual line reference axis) AX2 and passes through an intersecting point between the first reference optical axis AX1 and the fourth surface S14. On such an assumption, the obtuse angle α formed between the first reference optical axis AX1 and the traverse reference axis AX3 is from 95° to 135°. With such a configuration, it is possible to enhance the fitting property when the first image formation main body portion 105a including the projector lens 30 and the light guiding device 20 including the light guiding member 10 are arranged along the temporal areas from the face surface, and to easily achieve a decrease in thickness and weight of the apparatus as a result. In addition, it is possible to prevent a connecting portion between the projector lens 30 and the light guiding member 10 from forming a squareangular shape and projecting from the face surface by setting the obtuse angle α between the first reference optical axis AX1 and the traverse reference axis AX3 to be equal to or greater than 95°. In contrast, it is possible to suppress sticking of portions corresponding to a tip end of the projector lens 30 and the video image display element 82 from the side of the face surface or in the traverse direction by setting the obtuse angle α formed between both the axes AX1 and AX3 to be equal to or less than 135°. In addition, the obtuse angle α between both the axes AX1 and AX3 is set to be equal to or less than 105° from a viewpoint of reliably preventing the portions corresponding to the video image display element 82 and the like from projecting from the face surface. That is, it is more preferable to set the obtuse angle α formed between the first reference optical, axis AX1 and the traverse reference axis AX3 to an angle from 95° to 105°.

In addition, the first reference optical, axis AX1 and the traverse reference axis AX3 are on a reference plane HM which extends along an XZ plane corresponding to the paper surface of FIG. 6. The reference plane HM is a reference plane in terms of optical design and is slightly inclined downward toward the front side as shown in FIG. 3C. This configuration is achieved in consideration of the fact that it is natural for the viewer to direct a visual line of their eyes slightly downward and that the visual line inclined downward applies less burden on the eyes EY.

The light guiding member 10 is slightly inclined outward with respect to the traverse reference axis AX3 in relation to a rotation angle about a Y axis which is orthogonal to the reference plane HM. Specifically, the first surface S11 or the third surface S13 of the light guiding member 10 forms an inclination angle β with respect to the traverse reference axis AX3. As a result, the first and second optical members 101a and 101b are arranged so as to slightly project outward on the tip end side or at the center side which is interposed therebetween as shown in FIG. 3A. With such a configuration, it is possible to enhance the fitting property when the first and second optical members 101a and 101b are arranged along the face surface.

Returning to FIG. 5, a description will be given of the optical path of the video image light GL. The video image light GL after being incident on and passing through the fourth surface S14 of the light guiding member 10 advances while being converged, is reflected by the fifth surface S15 with a relatively weak positive refractive power when passing through the second light guiding portion 12, is incident again on the fourth surface S14 from the inside, and is reflected by the fourth surface S14.

The video image light GL reflected by the fourth surface S14 of the second light guiding portion 12 is incident on and fully reflected by the third surface S13, which has substantially no refractive power, at the first light guiding portion 11, and is incident on and fully reflected by the first surface S11 which has substantially no refractive power. The video image light GL forms an intermediate image in the light guiding member 10 as a relay optical system before or after passing through the third surface S13. An image plane II of the intermediate image corresponds to an image plane OI of the video image display element 82.

The video image light GL which is fully reflected by the first surface S11 is incident on the second surface S12. However, the video image light GL which is incident on the half mirror layer 15, in particular, partially transmits through the half mirror layer 15, is partially reflected by the half mirror layer 15, and is incident on and passes through the first surface S11 again. In addition, the half mirror layer 15 acts on the video image light GL reflected by the half mirror layer 15 as a half mirror layer with a relatively strong positive refractive power. In addition, the first surface S11 acts on the video image light GL which passes through the first surface S11 as a surface with no refractive power.

The video image light GL which passes through the first surface S11 is incident on pupils of the eyes EY of the viewer or on an equivalent position thereof as substantially parallel light flux. That is, the viewer views an image formed on the video image display element (video image element) 82 by the video image light GL as a virtual image.

In contrast, a part of the external light HL, which is incident on the further +X side than the second surface S12 of the light guiding member 10 passes through the third surface S13 and the first surface S11 of the first light guiding portion 11. However, substantially no aberration occurs at this time since the third surface S13 and the first surface S11 are substantially parallel planes (that is, substantially parallel planar optical surfaces). That is, the viewer views an external image through the light guiding member 10 with no strain. Similarly, a part of the external light HL, which is incident on the further −X side than the second surface S12 ox the light guiding member 10, that is, a part which is incident on the light transmitting member 50 does not cause aberration when passing through the third transmitting surface S53 and the first transmitting surface S51 provided in the light transmitting member 50 since the third transmitting surface S53 and the first transmitting surface S51 are substantially parallel planes. That is, the viewer views the external image through the light transmitting member 50 with no strain. Furthermore, a part of the external light HL, which is incident on the light transmitting member 50 corresponding to the second surface S12 of the light guiding member 10, causes substantially no aberration and the like when passing through the third transmitting surface S53 and the first surface S11 since the third transmitting surface S53 and the first surface S11 are substantially parallel planes. That is, the viewer views the external image through the light transmitting member 50 with a small amount of strain. In addition, both the second surface S12 of the light guiding member 10 and the second transmitting surface S52 of the light transmitting member 50 have substantially the same spherical shapes and have substantially the same refractive index, and a gap therebetween is filled with the adhesive layer CC with substantially the same refractive index. That is, the second surface S12 of the light guiding member 10 and the second transmitting surface S52 of the light transmit ting member 50 do not act as refractive surfaces of the external light HL.

However, the external light HL which is incident on the half mirror layer 15 partially transmits through the half mirror layer 15 and is partially reflected by the half mirror layer 15. Therefore, the external light HL from a direction corresponding to the half mirror layer 15 is weakened at the transmittance of the half mirror layer 15. In contrast, since the video image light GL is incident from the direction corresponding to the half mirror layer 15, the viewer views both the image formed on the video image display element (video image element) 82 and the external image in the direction of the half mirror layer 15.

A part, which is not reflected by the half mirror layer 15, of the video image light GL which is delivered in the light guiding member 10 and is incident on the second surface S12 is incident on the light transmitting member 50. However, the part of the video image light GL is prevented from returning to the light guiding member 10 by a reflection preventing portion which is provided in the light transmitting member 50 and is not shown in the drawing. That, is, the video image light GL which pass through the second surface S12 is prevented from returning to the optical path and becoming stray light. In addition, the external light HL which is incident from the side of the light transmitting member 50 and is reflected by the half mirror layer 15 is returned to the light transmitting member 50. However, the external light BL is prevented from being emitted to the light guiding member 10 by the aforementioned reflection preventing portion which is provided in the light transmitting member 50. That is, the external light HL reflected by the half mirror layer 15 is prevented from returning to the optical path and becoming stray light.

Hereinafter, a description will be given of a shape of the tip end portion 12*j* of the light guiding member 10 on the light incident side with reference to FIGS. 7a to 7F. The tip end portion 12*j* includes a light incident portion 12*i* including a part of the fourth surface S14. The tip end portion 12*j* includes a pair of planar projecting portions 12*t* so as to interpose the light incident portion 12*i* from an upper-lower direction, namely a ±Y direction. Both the projecting portions 12*t* are in parallel with each other and extend in the direction of the first reference optical axis AX1 in which the projector lens 30 is to be arranged. The projecting portions 12*t* are provided for the alignment and can be inserted into a fitting frame body 39*u* with a rectangular column shape as an abutting portion which is formed at the end portion 39*t* of the lens barrel portion 39 shown in FIG. 8 and the like. The projecting portions 12*t* are guided by the fitting frame body 39*u* and can slide in the direction of the first reference optical axis AX1 in a state of being inserted into the end portion 39*t*. The projecting portions 12*t* is precisely fitted to the fitting frame body 39*u* in a state of being inserted into and accepted by the fitting frame body 39*u*. That is, outer surfaces 12*m*, as flat surfaces with a wide width, of the projecting portions 12*t* function as positioning reference surfaces, and are made to abut or are brought into close contact with a pair of facing first inner surfaces 39*m* of the fitting frame body (abutting portion) 39*u* provided in the lens barrel portion 39 so as to be interposed therebetween after the assembly. In addition, a traverse side surfaces 12*n* of the projecting portions 12*t* can be made to function as the positioning reference surfaces in the same manner as the outer surfaces 12*m*, and can be made to abut or brought into close contact with a pair of facing second inner surfaces 39*n* of the fitting frame body (abutting portion) 39*u* after the assembly. By using the projecting portions 12*t* and the fitting frame body 39*u*, it is possible to align the light guiding member 10 with respect to the projector lens 30 or the optical device portion 130 in relation to the rotation in the direction orthogonal to the first reference optical axis AX1 or about the first reference optical axis AX1.

In addition, the fitting between the fitting frame body 39*u* on the side of the lens barrel portion 39 and the projecting portion 12*t* on the side of the light guiding member 10 is not limited to fastening fitting, and can be a gap fitting or middle fitting therebetween. By the fastening fitting between the fitting frame body 39*u* and the projecting potion 12*t*, it is also possible to realize support while omitted any of fixation portions 61*f* and 61*e* (see FIG. 8) which will be described later.

In the light guiding device 20 including the light guiding member 10, a pair of upper and lower side portions 91 and 92 includes tapered surfaces which are narrowed toward the inside. Ribs 94*c* and 194*c* which extends in a thin and long shape in the AB direction corresponding to the light guiding direction are formed at the upper side portion 92 of the pair. The rib 94*c* on the side of the light guiding member 10 has a uniform width and a uniform height as a whole and has a thick gate portion 94*g* at a location. The rib 194*c* on the side of the light transmitting member 50 also has a uniform width and a uniform height as a whole and has a thick gate portion 194*g* at a location.

Figure 8:
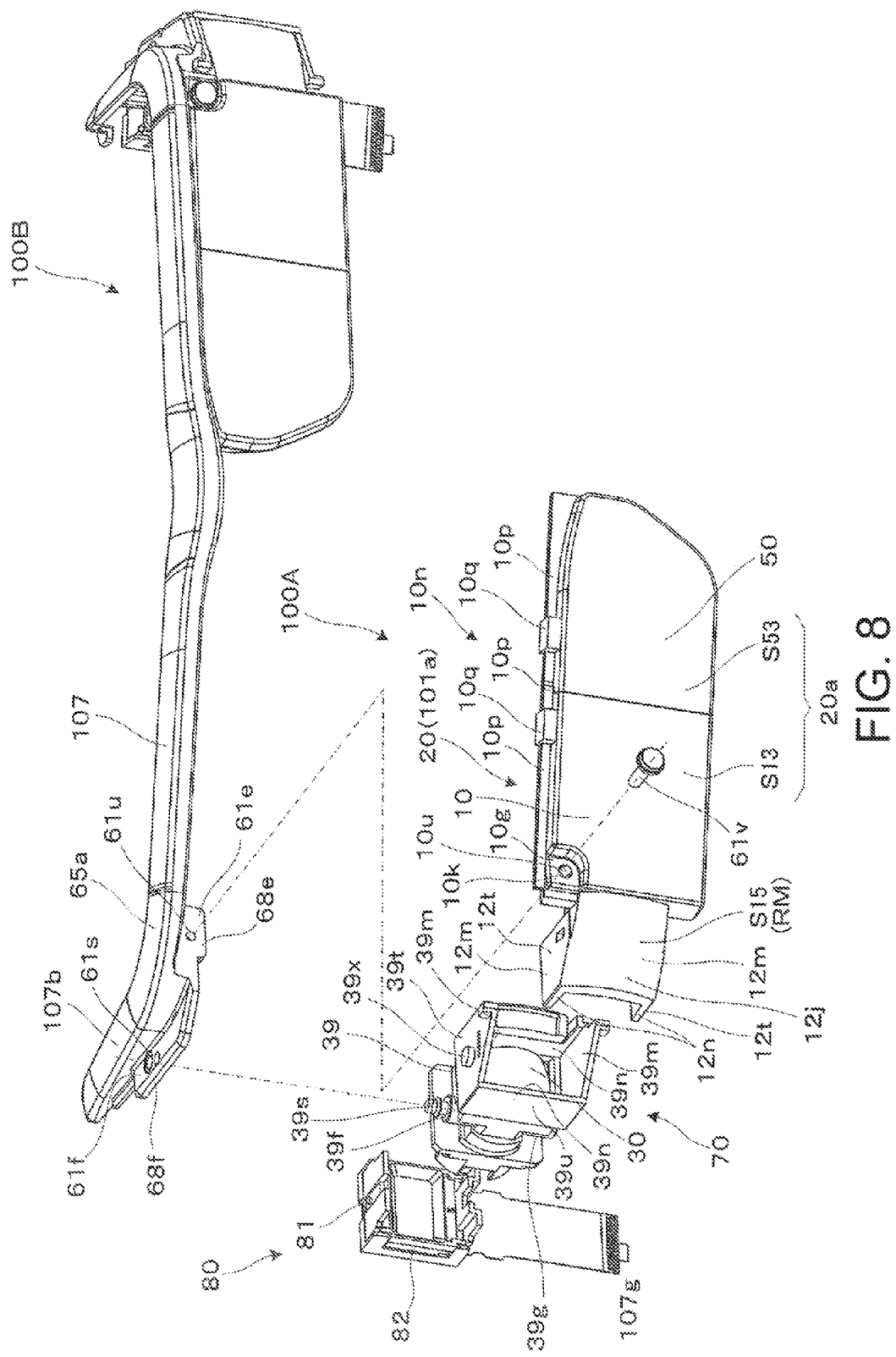
FIG. 8 is an exploded perspective view showing a state where a light guiding device and a projector lens in the virtual image display apparatus are fixed to a frame.

Hereinafter, a description will be given of assembly of the first display device 100A with the frame 107 with reference to FIG. 8. The optical device portion 130 which configures the first image formation main body portion 105*a* is directly fixed to a first fixation portion 61*f* provided at a side end portion 65*a* of the frame 107 (or a metal portion of the side portion 107*b*) by using an attachment portion 39*g* formed so as to be embedded in the lens barrel portion 39 accommodating the projector lens 30. In such fixation, it is possible to achieve the alignment by causing a rear surface 68*f* of the first fixation portion 61*f* to abut an upper end surface 39*f* and the like of the attachment portion 39*g* and to implement detachable and reliable fixation by screwing a screw 39*s* into a hole 61*s*. At this time, a boss 39*x* provided in the lens barrel portion 39 is fitted into a boss hole (not shown) in the frame 107, rotation of the lens barrel portion 39 is restricted, and positioning with respect to the rotation is performed. In contrast, the light guiding device 20 as the first optical member 101*a* is directly fixed to a second fixation portion 61e provided at a side end portion 65a of the frame 107 (or a metal portion of the side portion 107b) by using an attachment portion 10g formed at a neck portion or a stepped portion thereof. The attachment portion 10g is provided by using the light guiding device 20 on the incident side or a portion on the light incident side, specifically a corner of the first light guiding portion 11 in a periphery of a boundary between the first light guiding portion 11 and the second light guiding portion 12. In such fixation, it is possible to achieve alignment by causing an abutting surface 68e provided at a front portion of the second fixation portion 61e to abut a rear surface 10k of the attachment portion 10g, and to implement detachable and reliable fixation by screwing a screw 61v into a screw hole 61u via a screw hole 10u.

Figure 9:
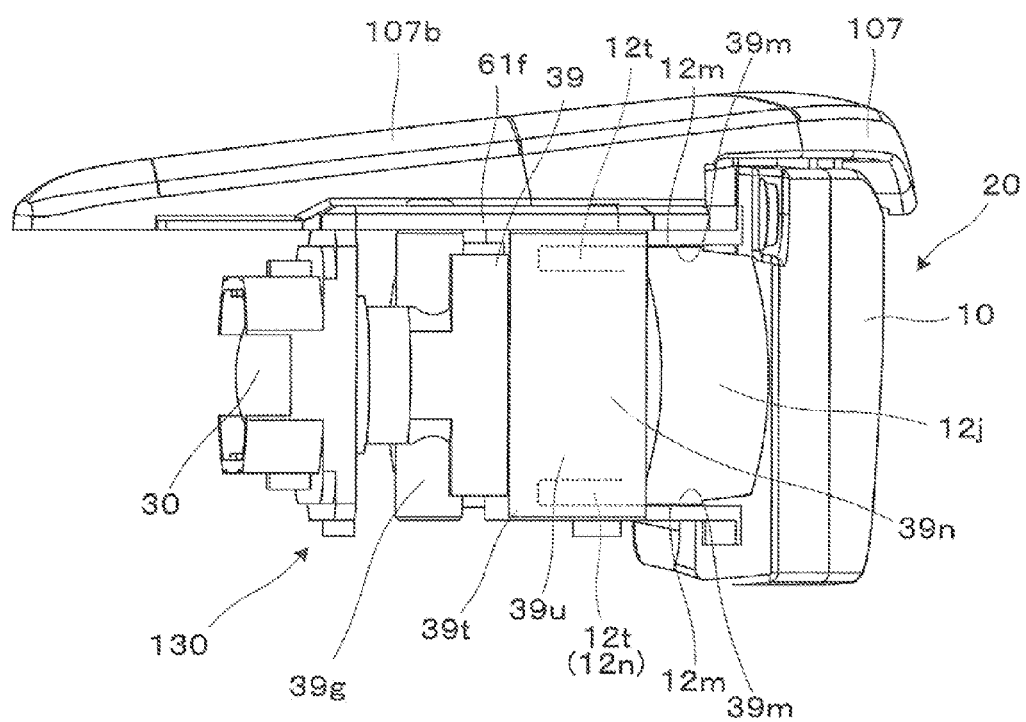
FIG. 9 is a side view illustrating a state where the optical device portion and the light guiding member are coupled.

The light guiding device 20 is locked in a state of being positioned with respect to the projector lens 30 by fitting the tip end portion 12j of the light guiding member 10 on the side of the second light guiding portion 12 to an end portion 39t with a rectangular frame shape, which is provided on the front end side of the lens barrel portion 39 accommodating the projector lens 30 and opens. That is, when the light guiding member 10 provided in the light guiding device 20 is fixed to the second fixation portion 61e in the frame 107, the tip end portion 12j on the side of the second light guiding portion 12 is inserted so as to be fitted into the fitting frame body (abutting portion) 39u of the lens barrel portion 39. The tip end portion 12j and the fitting frame body (abutting portion) 39u play a role in assisting fixation between the light guiding member 10 and the projector lens 30 via the frame 107. By fitting the tip end portion 12j to the fitting frame body 39u so as to insert the tip end portion 12j thereinto, the light guiding member 10 is set in a state of being positioned with respect to the lens tube portion 39. At this time, alignment based on abutting between the surfaces is achieved by causing an outer surface (positioning reference surface) 12m of the tip end portion 12j to abut an inner surface 39m of the fitting frame body 39u and causing the traverse side surface (positioning reference surface) 12n to abut an inner surface 39n of the fitting frame body 39u as shown in FIG. 9. As a result, the light guiding member 10 is positioned in relation to the rotation in the direction orthogonal to the first reference optical axis AX1 and about the first reference optical axis AX1 with respect to the projector lens 30 via the lens barrel portion 39. The lens barrel portion 39 functions as the coupling member for coupling the optical device portion 130 and the light guiding device 20 by providing the fitting frame body 39u as described above on the side of the end portion 39t.

Figure 10:
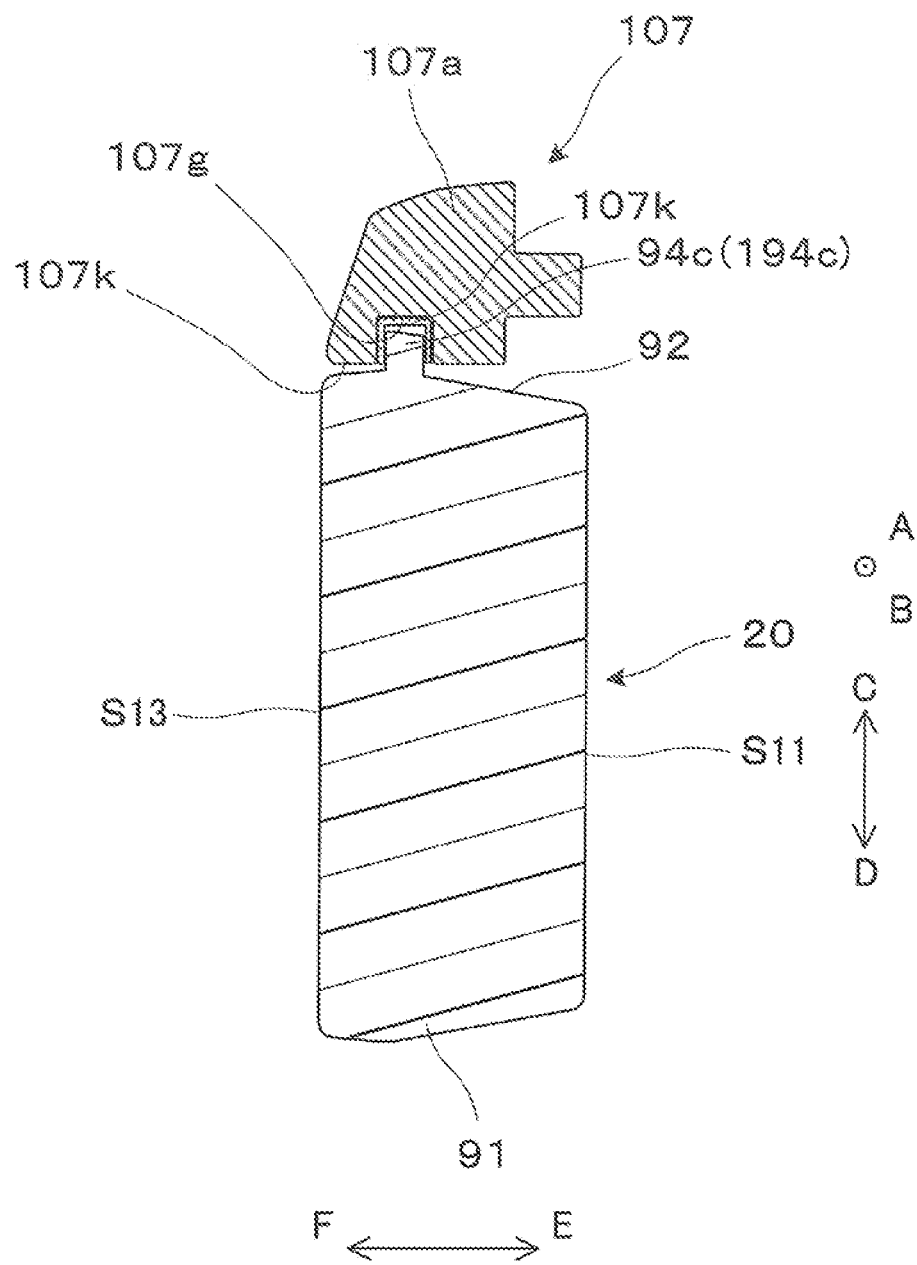
FIG. 10 is a cross-sectional view illustrating support of the light guiding member and the like by the frame.

FIG. 10 is a cross-sectional view illustrating a state where the ribs 94c and 194c of the light guiding device 20 are fitted into the groove 107g provided at the bottom of the front portion 107a of the frame 107 which configures the frame portion 102. It is possible to attach an elastic member 107k to the inner surface of the groove 107g and to prevent the ribs 94c and 194c from vibrating in the groove 107g. The light guiding device 20 can be slightly displaced in the AB direction, and slight expansion and contraction are allowed. In contrast, the light guiding device 20 cannot be displaced in the CD direction orthogonal to the AB direction, and rotation with respect to the frame 107 is inhibited.

According to the virtual image display apparatus 100 of the embodiment as described above, the light guiding member 10 is a block-shaped member including the first and third surfaces S11 and S13 which are a pair of facing planes, and therefore, it is possible easily simplify the appearance shape of the light guiding device 20 including the light guiding member 10 and to obtain a diopter scale and a magnification close to those of naked eyes in a case of seeing through the light guiding device 20 such as the light guiding member 10. In addition, since the first reference optical axis AX1 of the optical device portion 130 on the light emitting side extends from the light incident portion 12i of the light guiding member 10 in the direction in which the first reference optical axis AX1 forms the obtuse angle α with respect to the traverse reference axis AX3 corresponding to the alignment of the eyes EY, it is possible to enhance the fitting property when the optical device portion 130 and the light guiding device 20 are arranged from the face surface toward the temporal areas and to facilitate a decrease in thickness and weight as a result.

Others Configurations

Although the invention was described above based on the respective embodiments, the invention is not limited to the aforementioned embodiments and can be implemented in various states without departing from the gist of the invention. For example, the following modifications can be made.

Although the first and third surfaces S11 and S13 provided in the light guiding member 10 are in parallel with each other in the above description, it is also possible to form a small wedge angle between the first and third surfaces S11 and S13.

Although the alignment between the light guiding member 10 and the optical device portion 130 is performed by the pair of projecting portions 12t extending from the light guiding member 10 and the fitting frame body 39u provided in the optical device portion 130 in the above description, the coupling mechanism enabling the alignment is not limited to the mechanism with the square shape as described above, and it is also possible to use a fitting structure using a cylindrical surface or the like.

Although the alignment with respect to the optical device portion 130 is performed by using the outer surfaces 12m and the traverse side surfaces 12n of the projecting portions 12t provided at the light guiding member 10 in the above description, it is also possible to perform the alignment by using only the outer surfaces 12m, for example. In such a case, restriction directions by the alignment is for two degrees of freedom from among six degrees of freedom, but however, positioning precision in a specific level is achieved. In contrast, it is also possible to use the tip end surfaces of the projecting portions 12t for the alignment, and in such a case, it is possible to perform the alignment for all the six degrees of freedom. The projecting portions 12t and the fitting frame body 39u can be fixed by using an adhesive material or the like after the alignment.

Although the number of projector lenses 30 in the optical device portion 130 is three in the above description, the invention is not limited thereto, the number of the lenses can be changed in accordance with specifications, and a configuration in which the projector lens 30 is omitted is also applicable.

Figure 11:
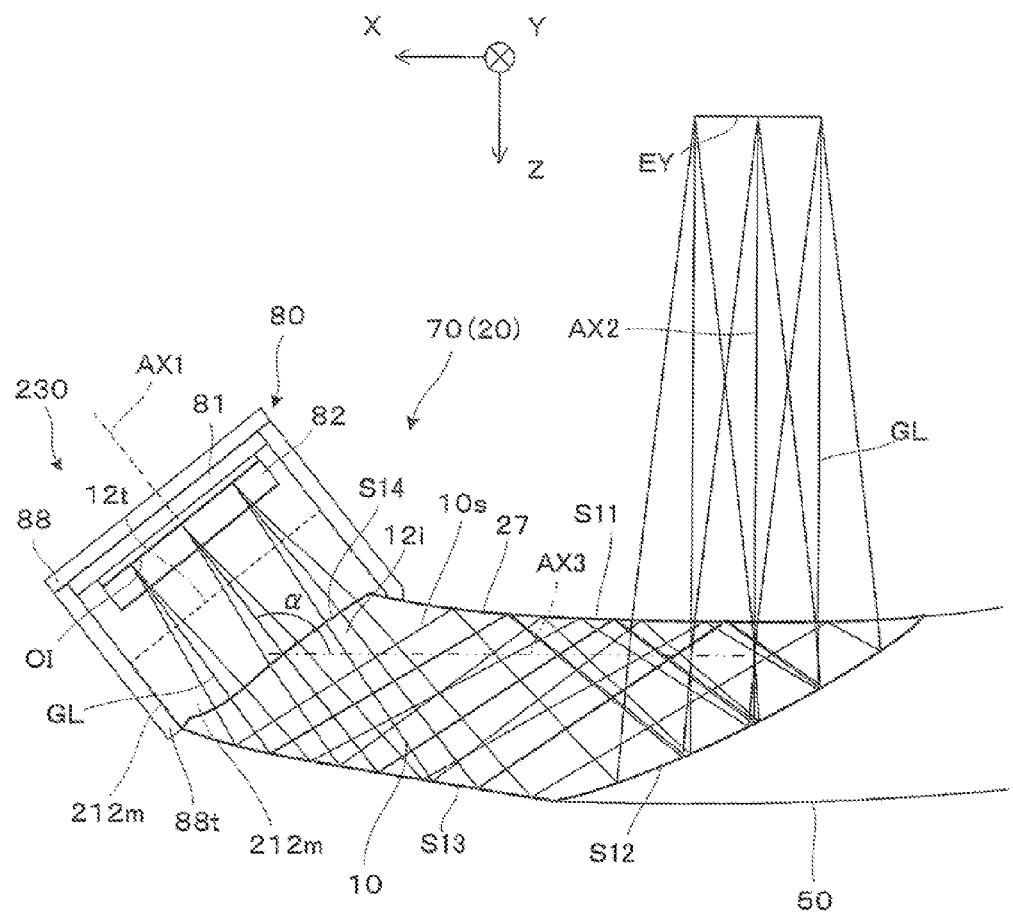
FIG. 11 is a cross-sectional view illustrating a virtual image display apparatus according to a modification example in a plan view.

FIG. 11 shows an example in which the perspective projection device 70 is configured only of the light guiding device 20. The first surface S11, the second surface S12, and the third surface S13 as surfaces with optical functions are provided in the light guiding member 10 of the light guiding apparatus 20 on the center side close to the nose, namely on the light emitting side, and the first surface S11 and the third surface S13 are curved but relatively flat as a whole, are substantially in parallel with each other, and are planar optical shapes in a broad sense of the term. On the peripheral side separate from the nose, namely on the light incident side, the fourth surface S14 is provided as a surface with an optical function. The image display device 80 functions as an optical device portion 230 and includes a holding portion 88 which accommodates and holds the illumination device 81 and the video image display element 82. The holding portion 88 is provided with an abutting portion 88t which enables relative positioning by abutting positioning reference surfaces 212m formed at projecting portions 12t additionally provided in the light incident portion 12i of the light guiding device 20. In such a case, the first reference optical axis AX1 on the side of the optical device portion 230 is inclined by 5° to 45° with respect to the second reference optical axis AX2 of the light guiding member 10 on the light emitting side. As a result, the obtuse angle α formed between the first reference optical axis AX1 and the traverse reference axis AX3 is from 95° to 135°.

Although the projecting ribs 94c and 194c are provided at side surfaces of the side surface portion 92 on the upper side of the light guiding device 20 in the above description, it is also possible to omit the ribs 94c and 194c. In such a case, it is possible to use the tapered surfaces 94a and 194a, the third surface S13, and the like to assist holding of the light guiding device 20.

Although the light guiding member 10 includes three non-axisymmetric aspherical surfaces in the above description, the invention is not limited thereto. In addition, although the projector lens has one non-axisymmetric aspheric surface in the above description, the projector lens can have two or more non-axisymmetric aspheric surfaces.

Although the half mirror layer (semi-transmitting reflective film) 15 is formed in a horizontally elongated rectangular region in the above description, the outline of the half mirror layer 15 can be appropriately modified in accordance with the purpose thereof and other specifications. In addition, the transmittance and the reflection rate of the half mirror layer 15 can be changed in accordance with the purpose thereof and other specifications.

Although distribution of display luminance in the video image display element 82 is not particularly adjusted in the above description, it is possible to irregularly adjust the distribution of the display luminance in a case where a difference occurs in luminance depending on a position.

Although the video image display element 82 configured of a transmissive liquid crystal display device or the like is used as the image display device 80 in the above description, the image display device 80 is not limited to the video image display element 82 configured of the transmissive liquid crystal display device or the like, and various kinds of image display devices can be used. For example, a configuration of using a reflective liquid crystal display device is also applicable, and it is also possible to use a digital micro mirror device or the like instead of the video image display element 82 configured of the liquid crystal display device or the like. In addition, it is also possible to use a self-emitting element, representative examples of which include an LED array and an organic EL (OLED), as the image display device 80.

Although the image display device 80 configured of the transmissive liquid crystal display device or the like is used in the above embodiment, it is also possible to use a scanning-type image display device instead of the transmissive liquid crystal display device.

In addition, although the above embodiment employs the configuration in which the light guiding member 10 and the light transmitting member 50 as the assistant optical block cover the entirety of the front side of the eyes EY of the wearer thereof, the invention is not limited thereto. A configuration in which a part including the second surface S12 with the spherical surface including the half mirror layer 15 covers apart of the eyes EY, namely a small-sized configuration in which a part of the front side of the eyes is covered and an uncovered is also present is also applicable.

Although the above description is about the virtual image display apparatus 100 provided with the pair of display devices 100A and 100B, the virtual image display apparatus can be implemented as a single display device. That is, a configuration in which an image is viewed by one eye by providing the perspective projection device 70 and the image display device 80 only for one of the right eye or the left eye instead of providing a pair of the perspective projection devices 70 and the image display device 80 for each of the right eye and the left eye is also applicable.

Although the half mirror layer 15 is a simple semi-transmitting film (for example, a metal reflective film or a dielectric body multilayered film) in the above description, the half mirror layer 15 can be replaced with a planar or spherical hologram element.

Although the light guiding direction of the light guiding member 10 and the like extend in the traverse direction in which the eyes EY are aligned in the above description, the light guiding member 10 can be arranged such that the light guiding direction thereof extends in a longitudinal direction. In such a case, the light guiding member 10 has a structure of being arranged in parallel not in series.

The entire disclosure of Japanese Patent Application NO. 2013-268722, filed Dec. 26, 2013 is expressly incorporated by reference herein.

What is claimed is:
1. A virtual image display apparatus comprising:
a video image element which generates video image light;
a light guiding member which includes a plurality of optical surfaces and guides the video image light from the video image element by reflecting the video image light on an inner surface side thereof; and
an optical device portion through which the video image light passes when the video image light from the video image element is made to be incident on the light guiding member, wherein:
the light guiding member is a block-shaped member which includes, as the plurality of optical surfaces, a pair of facing planar optical surfaces which extend substantially in parallel with each other and fully reflect the video image light, and
an optical axis of the optical device portion on a light emitting side thereof extends in a direction in which the optical axis forms an obtuse angle from a light incident portion of the light guiding member with respect to a traverse reference axis in parallel with an eye alignment direction.

2. The virtual image display apparatus according to claim 1, wherein the obtuse angle formed by the optical axis of the optical device portion on the light emitting side with respect to the traverse reference axis of the light guiding member is from 95° to 135°.

3. The virtual image display apparatus according to claim 1, wherein the optical axis of the optical device portion on the light emitting side extends along a reference plane which is in parallel with the traverse reference axis and a visual line reference axis extending substantially in a front direction of a face of a viewer.

4. The virtual image display apparatus according to claim 1, wherein the light guiding member extends so as to be inclined with respect to the traverse reference axis.

5. The virtual image display apparatus according to claim 1, wherein the optical device portion includes a lens and a lens barrel portion which holds the lens.

6. The virtual image display apparatus according to claim 5, wherein the optical device portion includes an abutting portion which enables relative positioning by abutting a positioning reference surface additionally provided in the light incident portion of the light guiding member.

7. The virtual image display apparatus according to claim 6, wherein the abutting portion is a fitting frame body provided at an end portion of the lens barrel portion which holds the lens therein.

8. The virtual image display apparatus according to claim 7, wherein the light guiding member includes a projecting portion provided with the positioning reference surface, and the fitting frame body receives the projecting portion.

9. The virtual image display apparatus according to claim 5, wherein the light guiding member is a relay optical system which forms an intermediate image therein.

10. The virtual image display apparatus according to claim 1, wherein the optical device portion includes a holding portion which holds the video image element, and wherein the holding portion includes an abutting portion which enables relative positioning by abutting a positioning reference surface additionally provided in the light incident portion of the light guiding member.

11. The virtual image display apparatus according to claim 1, further comprising: a frame portion which supports the light guiding member and the optical device portion, wherein the frame portion includes a fixation portion for fixing the light guiding member and the optical device portion which are relatively positioned.

12. The virtual image display apparatus according to claim 11, wherein the light guiding member includes a rib which is formed at a predetermined location along an outer periphery, and wherein the rib is fitted into a groove provided in the frame portion.

13. The virtual image display apparatus according to claim 11, wherein:
- the frame portion includes a frame portion which is arranged on a far side from a viewer and is made of metal and a resin portion which is arranged on a close side to the viewer, and
- the frame portion and the resin portion extend from locations at which the frame portion and the resin portion face temporal areas of the viewer in a direction in which the frame portion and the resin portion form an obtuse angle with respect to the traverse reference axis in the same manner as the optical axis of the optical device portion on the light emitting side.

14. The virtual image display apparatus according to claim 1, wherein the light guiding member includes four or more surfaces as the plurality of optical surfaces, and wherein the video image light from the video image element is fully reflected by a third surface which faces a first surface, is then fully reflected by the first surface, is reflected by a second surface, and is thus incident on the first surface before transmitting through the first surface from among the plurality of optical surfaces and reaching a viewer side.

15. The virtual image display apparatus according to claim 14, further comprising: a light transmitting member which is attached to the second surface of the light guiding member to cause a viewer to visually recognize external light and the video image light in an overlapped manner.

16. The virtual image display apparatus according to claim 1, further comprising:
- two display devices, wherein one of the two display devices includes the video image element and the light guiding member, and the other of the two display devices includes another video image element and another light guiding member.

\* \* \* \* \*